United States Patent
Spaulding et al.

(10) Patent No.: US 9,373,019 B2
(45) Date of Patent: Jun. 21, 2016

(54) PASSIVE LIGHT-BASED DATA COMMUNICATION

(71) Applicants: Jeremy Spaulding, Marblehead, MA (US); Karlin Jessen, Reading, MA (US)

(72) Inventors: Jeremy Spaulding, Marblehead, MA (US); Karlin Jessen, Reading, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 0 days.

(21) Appl. No.: 14/459,362

(22) Filed: Aug. 14, 2014

(65) Prior Publication Data

US 2016/0048716 A1 Feb. 18, 2016

(51) Int. Cl.
*G06K 5/04* (2006.01)
*G06K 7/14* (2006.01)
*G06K 7/10* (2006.01)

(52) U.S. Cl.
CPC .......... *G06K 7/1439* (2013.01); *G06K 7/10861* (2013.01)

(58) Field of Classification Search
CPC .................. G08G 1/096716; G08G 1/096783; G08G 1/09675; G08G 1/096758
USPC ........................................ 235/462.01, 462.12
See application file for complete search history.

(56) References Cited

U.S. PATENT DOCUMENTS

| | | | |
|---|---|---|---|
| 6,213,401 B1 * | 4/2001 | Brown | 235/486 |
| 6,864,784 B1 * | 3/2005 | Loeb | 340/441 |
| 7,100,825 B2 * | 9/2006 | Levine | 235/384 |
| 7,218,214 B2 * | 5/2007 | Werner et al. | 340/468 |
| 7,679,605 B2 * | 3/2010 | Cheah et al. | 345/166 |

* cited by examiner

*Primary Examiner* — Seung Lee
(74) *Attorney, Agent, or Firm* — Andrew Martin

(57) ABSTRACT

Techniques are disclosed for light-based communication using a passive light-reflective device having specially coded reflective or printed optics. The optics can be mounted to an object and configured to reflect light such that a receiver is able to receive the reflected light. The optics are further configured to alternatively display a number of different patterns that change as the receiver moves with respect to the optics, thus causing the receiver to receive an apparent stream of modulated light, which represents coded information that can be decoded into meaningful information. The optics can be mounted to a traffic control or other roadside device. As a vehicle approaches and passes the traffic control device, light reflects off of the optics in a series of patterns. This reflected light can be received by the vehicle and processed to relay the information to the operator or on-board vehicle system.

13 Claims, 5 Drawing Sheets

PASSIVE LIGHT-BASED DATA COMMUNICATION

FIELD OF THE DISCLOSURE

This disclosure relates to the field of light-based communication, and more particularly, to techniques for data communication using a passive light-reflective device.

BACKGROUND

Data communication via light-based sources generally involves the modulation of light between a light source and a detector (e.g., a photodiode). The modulation is structured in such a way as to represent coded information. For example, a pulse of light emitted by the light source during an interval of time may represent a binary one ("1"), and the absence of light during a subsequent time interval may represent a binary zero ("0"). In another example, shifts in the frequency or polarity of the light can represent coded information. The sequence of detected light pulses, or lack thereof, may then be decoded and converted into a meaningful piece of information according to some predefined coding scheme. Information coded by such a data communication method is similar in form to information transmitted over other types of media (e.g., electronic, acoustic, radio, etc.), which generally require an active source of power. However, such techniques are not suitable for applications where a power source is not available, is not cost effective or where the supply of power is limited and therefore must be conserved.

BRIEF DESCRIPTION OF THE DRAWINGS

The accompanying drawings are not intended to be drawn to scale. In the drawings, each identical or nearly identical component that is illustrated in various figures is represented by a like numeral.

DETAILED DESCRIPTION

Figure 1:
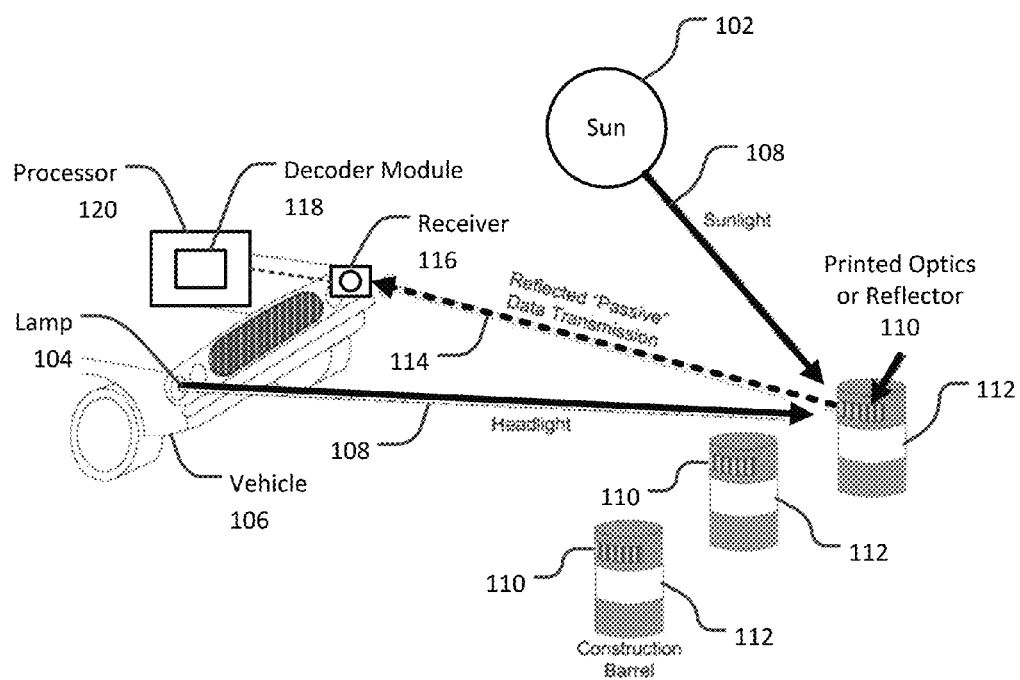
FIG. 1 illustrates an example implementation of a technique for data communication using a passive light-reflective device, in accordance with an embodiment of the present disclosure.

Along roadways, information that is useful or important for a driver is generally communicated using wayside signage that is visible to the driver, via AM/FM radio, personal mobile device (e.g. smart phone or similar device) either stand alone or connected to the on-board vehicle system or through navigation systems on-board the vehicle. However, such information is not presently communicated from the wayside to the vehicle using light-based communication techniques because of the difficulty and cost of installing and maintaining the active power sources for such light sources and the need for an appropriate receiver system on the vehicle.

To this end, and in accordance with an embodiment of the present invention, techniques are disclosed for light-based communication using a passive light-reflective device. The light can include light in the visible spectrum or light in the beyond-visible spectrum. The passive light-reflective device can include specially coded reflective or printed optics. The optics can be mounted to an object and are configured to reflect light such that a receiver, such as a light detector mounted to an automobile, is able to receive the reflected light. The optics are further configured to alternatively display different patterns that change as the receiver moves with respect to the optics, thus causing the receiver to asynchronously receive an apparent stream of modulated or encoded light. The modulated light represents coded information that can be decoded into a message. In an example embodiment, optics can be mounted to a highway construction barrel, traffic bollard, traffic cone, barrier, abutment, sign, post, or other traffic control device or other roadside object. However, it will be understood that the optics can be mounted to any object. As a vehicle approaches and passes the traffic control device, light from the sun, the vehicle headlamps, or other light source reflects off of the optics in a series of patterns that contain meaningful information about the object (e.g., construction barrel) or situation (e.g., construction zone). This reflected, passive, light-based communication data can be received by the automobile and processed to relay the information about the object or situation to the operator or used within the vehicle system for various safety and information functions. The information may, for example, include a message that can be relayed to the vehicle operator, such as a construction zone speed limit, detour routing, or other information relevant to the operation of the vehicle in the vicinity of the object. Similarly, the optics can be implemented in marine and aeronautical applications, such as on buoys, mooring bollards, runway markers, and the like for use by mariners and aviators. In some embodiments, the optics can be configured such that a message is received only when the receiver is moving in a particular direction or at a particular speed with respect to the optics. In yet other embodiments, the optics can be configured that different messages are received based on the direction, speed, or both of the receiver. Numerous configurations and variations will be apparent in light of this disclosure.

As used in this disclosure, the terms "code" and "coded" refer to a rule for transforming a message from one form to another. For example, a code may be used to encode a text message into a bar code, to decode a bar code into a text message, or both.

As used in this disclosure, the term "passive light-reflective device" refers to a device that does not require an active power source to emit or reflect light. Such a device may, for example, include a printed or lenticular surface configured to reflect light emitted by an external source (e.g., the sun or a vehicle's headlamps), or an image or pattern formed of light emitted by such a source, in a certain direction with respect to the surface.

Example System

FIG. 1 illustrates an example implementation of a technique for data communication using a passive light-reflective device, in accordance with an embodiment. The Sun 102, vehicle headlamps 104, or other light source emits light 108 that reflects off of printed optics 110 or other light-reflective surface mounted to an object 112. For example, as depicted in FIG. 1, the object 112 may be a construction barrel set out in a highway construction zone. The optics 110 can, however, be mounted to any object, including a vehicle. The optics 110 are oriented such that the light 108 reflects toward a vehicle 106 or other moving object. A receiver 116 is mounted to the vehicle 106. As the vehicle 106 moves with respect to the optics 110, a series of modulated light patterns 114 or images reflected by the optics are asynchronously detected by the receiver 116. Each of the light patterns 114 represents a set of encoded information, and a combination of these encoded information sets can be decoded into a message by a decoder module 118 of a processor 120. In this manner, the message is not received by the vehicle 106 unless and until the vehicle moves such that multiple light patterns 114 are detected. If the vehicle is not moving relative to the plane of the encoded reflector, at most one of the light patterns can be detected, which may represent only a portion of the data needed to decode the message.

Figure 2:
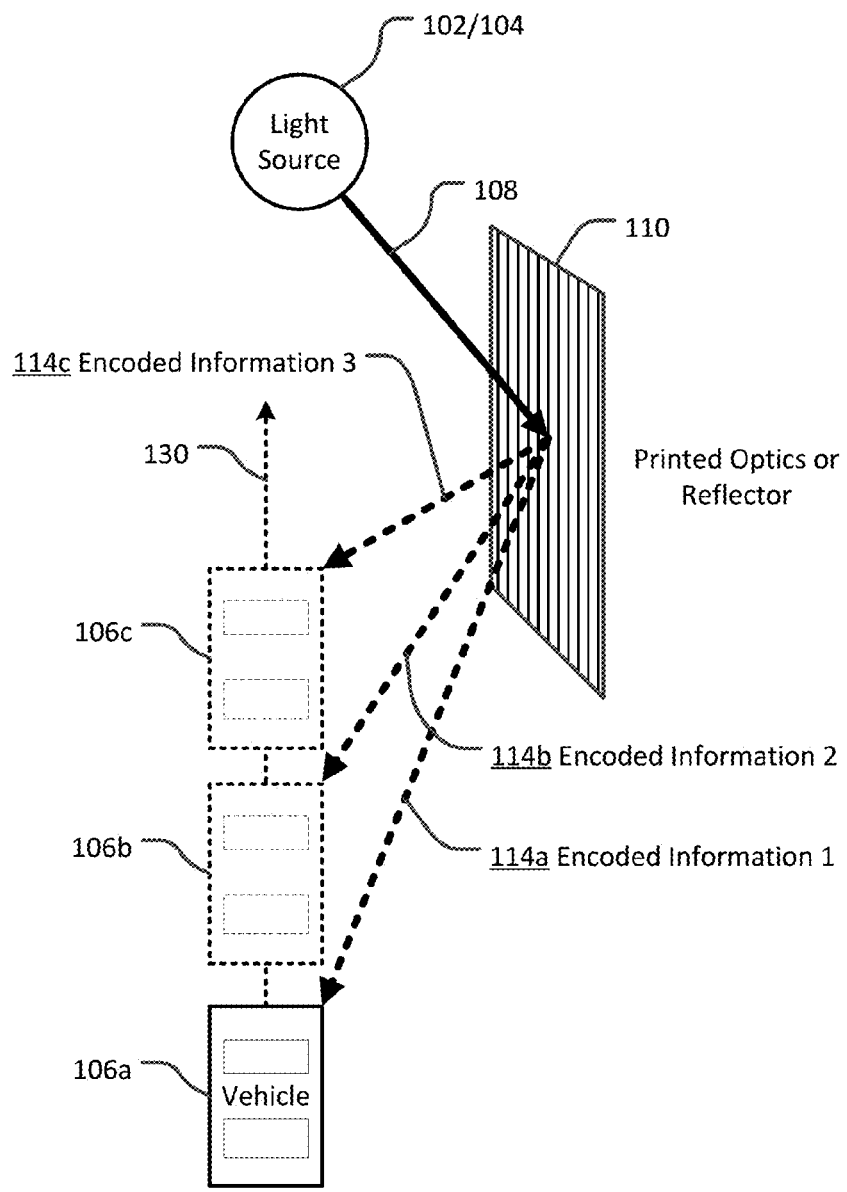
FIG. 2 illustrates an example technique for data communication using a passive light-reflective device, in accordance with an embodiment of the present disclosure.

FIG. 2 illustrates an example technique for data communication using a passive light-reflective device, in accordance with an embodiment. As described above with respect to FIG. 1, light 108 from a light source (e.g., the Sun 102 or vehicle headlamps 104) reflects off of the optics 110 toward the vehicle 106 as it moves with respect to the optics between positions 106*a*, 106*b* and 106*c* in direction 130. At position 106*a*, the vehicle receives a light pattern representing a first set of encoded information 114*a*. At position 106*b*, the vehicle receives a different light pattern representing a second set of encoded information 114*b*. At position 106*c*, the vehicle receives yet another different light pattern representing a third set of encoded information 114*c*. It will be understood that, in some embodiments, the various sets of encoded information can be the same (e.g., the first and third sets of encoded information 114*a*, 114*c*), and that there can be any number of different sets of encoded information, depending on the position of the vehicle, the direction of motion of the vehicle, or both. For example, if the direction 130 of the vehicle is opposite normal traffic flow, the encoded information can include a "wrong way" message, which would not be the case if the vehicle was moving in the opposite of direction 130.

Figure 3A:
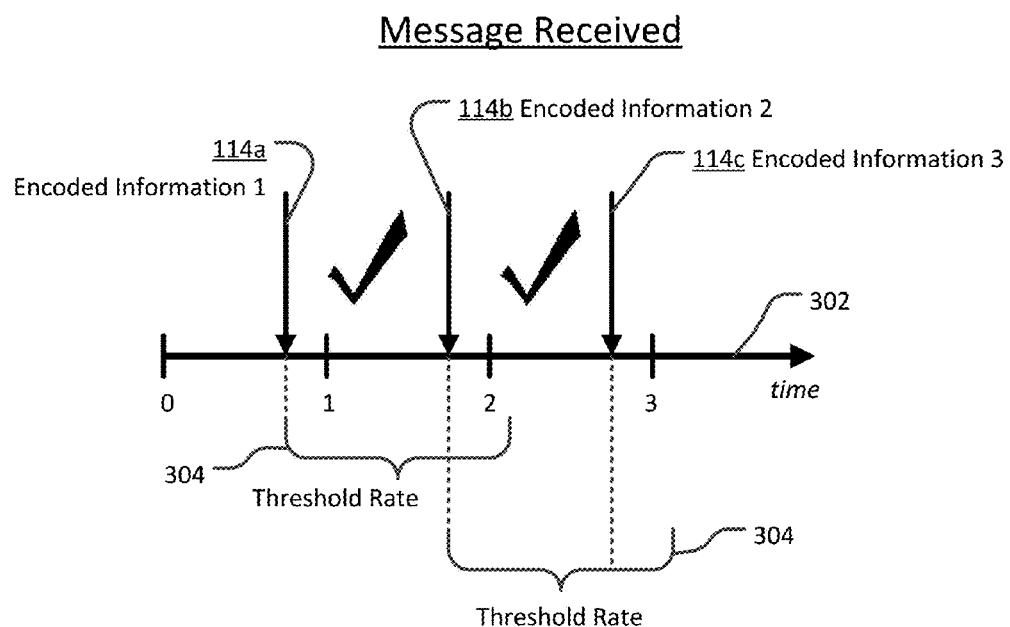
FIGS. 3A and 3B illustrate an example technique for data communication using a passive light-reflective device, in accordance with an embodiment of the present disclosure.
Figure 3B:
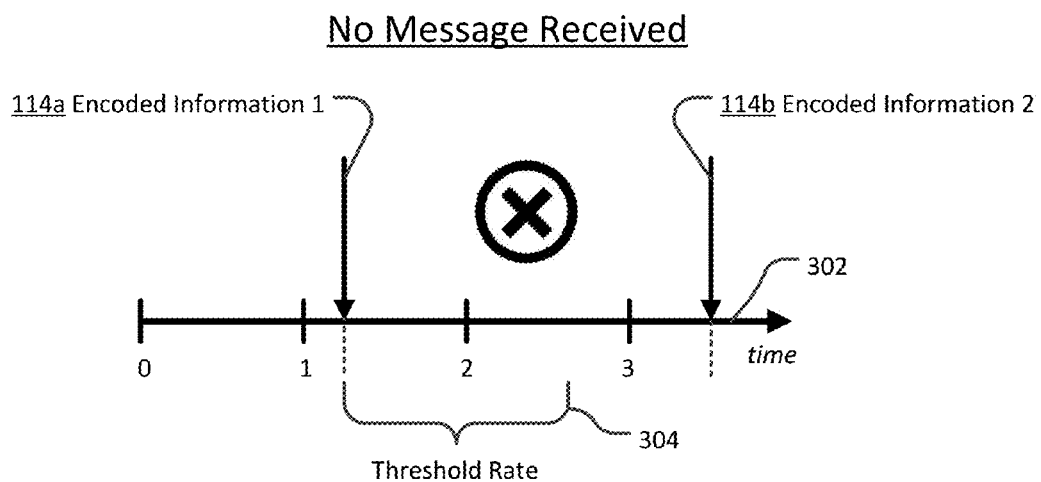

FIGS. 3A and 3B illustrate an example technique for data communication using a passive light-reflective device, in accordance with an embodiment. As described above with respect to FIG. 1, the receiver 116 can detect the various light patterns as the vehicle 106 moves. Based on the speed of the vehicle 106, the receiver 116 individually detects each light pattern at different points in time, as represented along axis 302 of FIGS. 3A and 3B. Each light pattern represents, for example, the first, second and third sets of encoded information 114*a*, 114*b*, 114*c*. Of course, if the vehicle 106 is not moving, the receiver 116 will detect at most one light pattern, and thus at most one set of encoded information. If more than one set of encoded information is needed to decode the message, the vehicle must be in motion with respect to the optics 110 to detect multiple light patterns. A threshold rate 304 can be established to determine the maximum amount of time that can elapse between receiving each set of encoded information 114*a*, 114*b*, 114*c*. If each set of encoded information 114*a*, 114*b*, 114*c* is received at or below the threshold rate 304, then a valid message is received, such as depicted in FIG. 3A. However, if any set of encoded information 114*a*, 114*b*, 114*c* is received above the threshold rate 304, such as depicted in FIG. 3B, then no valid message is received. This latter example may be useful, for instance, to disregard or prevent receipt of the message when the vehicle 106 is moving below a certain speed. For example, if a lenticular array of optics containing a complex encoded message is affixed to a speed limit sign, the driver would not receive a speed limit message if travelling within the speed limit, but would receive a "you are speeding" message if the speed limit is exceeded. Likewise, in other embodiments, the threshold rate 304 can be a maximum rate to disregard or prevent receipt of the message when the vehicle 106 is moving above a certain speed. In yet other embodiments, more than one threshold rate can be established, for example, to set a range of speeds between which a message is received or not received, as the case may be. In some embodiments, the threshold rate 304 is a software parameter.

Example Methodologies

Figure 4:
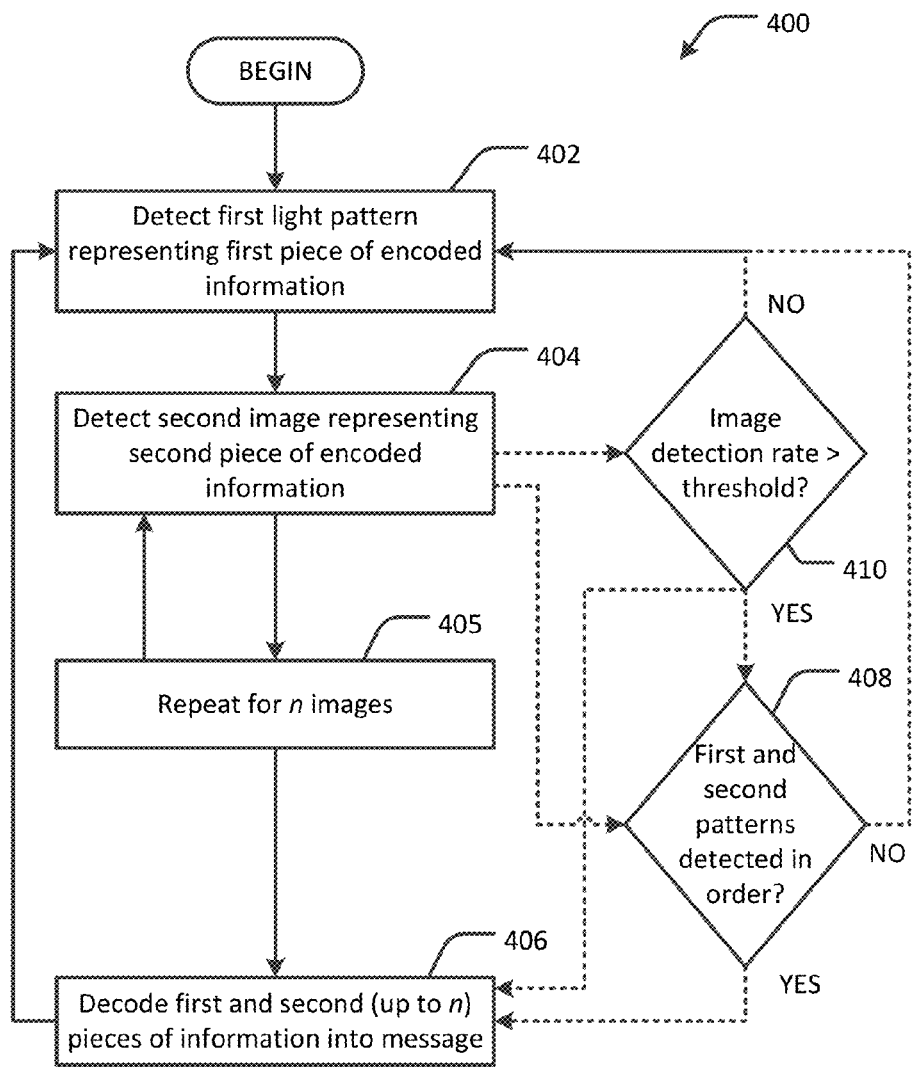
FIG. 4 is a flow diagram of an example methodology for data communication using a passive light-reflective device, in accordance with an embodiment of the present disclosure.

FIG. 4 is a flow diagram of an example methodology 400 for data communication using a passive light-reflective device, in accordance with an embodiment. The example methodology 400 may, for example, be implemented by the decoder module 118 of FIG. 1. The method 400 begins by detecting 402 a first light pattern or image created by reflection of light from a passive light-reflective device as the receiver changes position relative to the passive light-reflective device. The method 400 continues by detecting 404 a second light pattern or image created by reflection of light from the passive light-reflective device as the receiver changes position relative to the passive light-reflective device (e.g., the receiver moves to a different position from where the first light pattern was detected). In some cases, more than two light patterns or images (e.g., up to n light patterns or images) can be detected (e.g., such as described with respect to the example of FIG. 2). Each of the light patterns represents a different piece of encoded information. In some embodiments, each light pattern is static. However, it will be understood that two individual light patterns received by the receiver at different positions relative to the passive light-reflective device can be different from each another. In some embodiments, each light pattern forms at least a portion of a bar code, such that a complete bar code can be obtained from the detection of multiple light patterns. The method 400 continues by decoding 406 the encoded information into a message. For example, if the first and second pieces of encoded information, in combination, form a bar code with a message encoded therein, a message can be obtained by decoding the combined pieces of information.

In some embodiments, the first and second pieces of encoded information are decoded based at least in part on an order in which the light patterns are detected 408. For example, if one or more pieces of encoded information include sequencing data indicating an order in which the encoded information should be received, a message encoded in a combination of all pieces of encoded information will only be decoded if each piece of encoded information is received in the designated order. If, on the other hand, one or more pieces of information are received out of the designated order, no message will be decoded. This can be useful, for example, if the vehicle described in FIG. 2 is moving in the opposite direction of arrow 130, in which case the pieces of encoded information would be received in reverse sequence (e.g., 114*c* followed by 114*b* followed by 114*a*). In such cases it may be desirable to suppress decoding or disregard the message because, for instance, the vehicle is moving away from the optics/object and thus the message is of no importance to the operator. In some embodiments, each piece of information includes sequence information that can be used to decode, or alternatively to suppress decoding of, a message if any of the pieces of information are received out of the designated order.

In some embodiments, the first and second pieces of encoded information are decoded based at least in part on a rate at which the light patterns are detected 410. For example, if the frequency at which the first and second light patterns are detected is greater than a predetermined threshold (e.g., at least two light patterns detected within five seconds, one second, a half-second, a quarter-second, etc.), a message encoded in a combination of pieces of encoded information will be decoded. Otherwise, the message may not be decoded or disregarded. In some other embodiments, the opposite can be true. That is, a message is decoded if and when the frequency is less than a predetermined threshold. Further examples will be apparent in light of this disclosure. In yet some other embodiments, the encoded information is decoded into a message while the receiver is in motion relative to the passive light-reflective device, otherwise the message is not decoded or is disregarded by the system.

Example Computing Device

Figure 5:
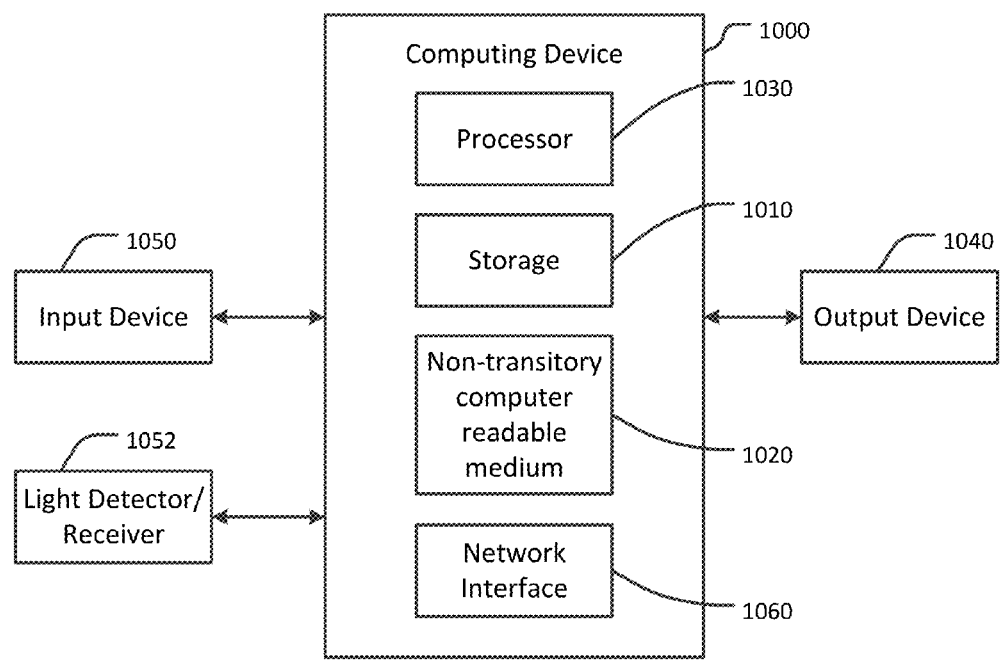
FIG. 5 is a block diagram representing an example computing device that may be used in accordance with an embodiment of the present disclosure.

FIG. 5 is a block diagram representing an example computing device 1000 that may be used to perform any of the techniques as variously described in this disclosure. For example, the processor 120 may be implemented in the computing device 1000. The computing device 1000 may be any computer system, such as an electronic control unit (ECU), imbedded micro processor system workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing device that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen, monitor or other on-board vehicle interface (e.g. warning lights), which may display one or more user interfaces provided in accordance with some embodiments. The output device 1040 may also display/provide other aspects, elements and/or information or data associated with some embodiments. The computing device 1000 may include other I/O devices 1050 for receiving input from various devices, such as a light detector/receiver 1052, or a user; for example, a keyboard, a joystick, a game controller, a pointing device (e.g., a mouse, a user's finger interfacing directly with a display device, etc.), or any suitable user interface. The computing device 1000 may include other suitable conventional I/O peripherals. The computing device 1000 can include and/or be operatively coupled to various suitable devices for performing one or more of the functions as variously described in this disclosure. For instance, the computing device may include or be operatively coupled to the light detector/receiver 1052 for detecting a light pattern reflected from a light-reflective device, and a network interface 1060 for communicating with other devices via a network, such as the Internet or a local network (e.g., based on a CAN bus (controller area network) architecture or standard, Bluetooth or other wireless network).

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

In other embodiments, the functional components/modules may be implemented with hardware, such as gate level logic (e.g., FPGA) or a purpose-built semiconductor (e.g., ASIC). Still other embodiments may be implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

As will be appreciated in light of this disclosure, the various modules and components of the system shown in FIG. 1, such as the decoder module 118, can be implemented in software, such as a set of instructions (e.g., C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the processor 120, can be integrated into, for example, one or more ECUs, desktop or laptop computers, workstations, tablets, smartphones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Numerous embodiments will be apparent in light of the present disclosure, and features described in this disclosure can be combined in any number of configurations. One example embodiment provides a passive data communication system comprising: a receiver configured to individually detect each of a plurality of light patterns reflected off of a passive light-reflective device as the receiver changes position relative to the passive light-reflective device, each of the light patterns representing a different piece of encoded information; and a processor operatively connected to the receiver, the processor configured to decode the encoded information into a message. In some cases, the processor is further configured to decode the encoded information based at least in part on an order in which the light patterns are detected. In some cases, the processor is further configured to decode the encoded information based at least in part on a rate at which the light patterns are detected. In some cases, the processor is further configured to decode the encoded information only while the rate exceeds a predetermined threshold rate. In some cases, the processor is further configured to decode the encoded information only while the receiver is in motion relative to the passive light-reflective device. In some cases, each of the light patterns is static. In some cases, each of the light patterns forms at least a portion of a bar code.

Another example embodiment provides a system including a storage having at least one memory, and one or more processors each operatively coupled to the storage. The one or more processors are configured to carry out a process including detecting, by a receiver, each of a plurality of light patterns reflected off of a passive light-reflective device as the receiver changes position relative to the passive light-reflective device, each of the light patterns representing a different piece of encoded information; and decoding, by a processor operatively coupled to the receiver, the encoded information into a message. In some cases, the process includes decoding the encoded information based at least in part on an order in which the light patterns are detected. In some cases, the process includes decoding the encoded information based at least in part on a rate at which the light patterns are detected. In some cases, the process includes decoding the encoded information only while the rate exceeds a predetermined threshold rate, is below the predetermined threshold rate, or is within a range of predetermined threshold rates. In some cases, the process includes decoding the encoded information only while the receiver is in motion relative to the passive light-reflective device. In some cases, each of the light patterns is static. In some cases, each of the light patterns forms at least a portion of a bar code. Another embodiment provides a non-transient computer-readable medium or computer program product having instructions encoded thereon that when executed by one or more processors cause the processor to perform one or more of the functions defined in the present disclosure, such as the methodologies variously described in this paragraph. As previously discussed, in some cases, some or all of the functions variously described in this paragraph can be performed in any order and at any time by one or more different processors.

The foregoing description and drawings of various embodiments are presented by way of example only. These examples are not intended to be exhaustive or to limit the invention to the precise forms disclosed. Alterations, modifications, and variations will be apparent in light of this disclosure and are intended to be within the scope of the invention as set forth in the claims.

What is claimed is:

1. A data communication system comprising:
   a receiver configured to individually detect each of a plurality of different light patterns reflected off of a passive light-reflective device as the receiver changes position relative to the passive light-reflective device wherein the passive light-reflective device is a static pattern, each of the light patterns representing a different piece of encoded information; and
   a processor operatively connected to the receiver, the processor configured to decode the encoded information of each of the plurality of different light patterns into a single message.

2. The system of claim 1, wherein the processor is further configured to decode the encoded information based at least in part on an order in which the light patterns are detected.

3. The system of claim 1, wherein the processor is further configured to decode the encoded information based at least in part on a rate at which the light patterns are detected.

4. The system of claim 1, wherein the processor is further configured to decode the encoded information only while the rate is within a range of predetermined threshold rates.

5. The system of claim 1, wherein the processor is further configured to decode the encoded information only while the receiver is in motion relative to the passive light-reflective device.

6. The system of claim 1, wherein each of the light patterns is static.

7. The system of claim 1, wherein each of the light patterns forms at least a portion of a bar code.

8. A message receiving system comprising:
   means for detecting each of a plurality of light patterns emanating from a passive light-reflective device as the receiver changes position relative to the passive light-reflective device, each of the light patterns representing a different piece of encoded information wherein the passive light-reflective device has a constant, static pattern; and
   a processor operatively connected to the means, the processor configured to decode the encoded information of each of the plurality of different light patterns into a single message.

9. The system of claim 8, wherein the processor is further configured to decode the encoded information based at least in part on an order in which the images are detected.

10. The system of claim 8, wherein the processor is further configured to decode the encoded information based at least in part on a rate at which the light patterns are detected.

11. The system of claim 8, wherein the processor is further configured to decode the encoded information only while the rate exceeds a predetermined threshold rate.

12. The system of claim 8, wherein the processor is further configured to decode the encoded information only while the receiver is in motion relative to the passive light-reflective device.

13. The system of claim 8, wherein each of the light patterns forms at least a portion of a bar code.

* * * * *